(12) United States Patent
King et al.

(10) Patent No.: US 10,578,269 B2
(45) Date of Patent: Mar. 3, 2020

(54) PARTIAL METALLIZATION OF LIGHT GUIDES FOR A BINARY AESTHETIC

(71) Applicant: Valeo North America, Inc., Troy, MI (US)

(72) Inventors: Robert King, Seymour, IN (US); Charles Crespin, Seymour, IN (US)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 16/021,878

(22) Filed: Jun. 28, 2018

(65) Prior Publication Data

US 2020/0003388 A1    Jan. 2, 2020

(51) Int. Cl.
| | | |
|---|---|---|
| *F21S 43/00* | (2018.01) | |
| *F21S 43/241* | (2018.01) | |
| *F21S 43/33* | (2018.01) | |
| *F21S 43/50* | (2018.01) | |
| *B60Q 1/30* | (2006.01) | |
| *F21Y 115/10* | (2016.01) | |
| *F21W 121/00* | (2006.01) | |

(52) U.S. Cl.
CPC .............. *F21S 43/241* (2018.01); *B60Q 1/30* (2013.01); *F21S 43/33* (2018.01); *F21S 43/50* (2018.01); *B60Q 2400/20* (2013.01); *F21W 2121/00* (2013.01); *F21Y 2115/10* (2016.08)

(58) Field of Classification Search
CPC .. F21S 43/235–251; F21S 43/33; F21S 43/50; B60Q 1/30
See application file for complete search history.

(56) References Cited

U.S. PATENT DOCUMENTS

| | | | |
|---|---|---|---|
| 6,556,258 B1* | 4/2003 | Yoshida | G02B 6/0055 |
| | | | 349/61 |
| 9,855,888 B1* | 1/2018 | Dellock | B60Q 3/20 |
| 10,321,549 B2* | 6/2019 | Schuch | H05B 37/0281 |
| 2002/0080598 A1* | 6/2002 | Parker | G02B 6/0036 |
| | | | 362/616 |
| 2002/0191412 A1 | 12/2002 | Bost et al. | |
| 2006/0104092 A1* | 5/2006 | Feng | G02B 6/0016 |
| | | | 362/626 |

(Continued)

FOREIGN PATENT DOCUMENTS

JP    2005-55861 A    3/2005

*Primary Examiner* — Gerald J Sufleta, II
(74) *Attorney, Agent, or Firm* — Oblon, McClelland, Maier & Neustadt, L.L.P.

(57) ABSTRACT

The present disclosure relates to a vehicle indicator lighting assembly or other lighting device for providing dual-color outputs in a lit state and an unlit state, respectively. Specifically, a color of a lighting device may be controlled such that an unlit state may communicate a desired color corresponding to a surface of a component of the lighting device. For instance, the lighting device can include a light guide having one or more decoupling regions and a bezel having one or more effecting facets arranged relative to the light guide. The light guide may be optically-coupled to a light source. The one or more effecting facets may be designed such that, when the lighting device is not illuminated by the light source, a color of a surface of the one or more effecting facets is displayed to an observer in a trailing vehicle by reflection of ambient light from an environment external to the vehicle.

14 Claims, 8 Drawing Sheets

(56) References Cited

U.S. PATENT DOCUMENTS

| | | |
|---|---|---|
| 2008/0186728 A1 | 8/2008 | Zaback et al. |
| 2010/0326494 A1* | 12/2010 | Okamoto ............ H01L 31/0543 |
| | | 136/246 |
| 2015/0185400 A1* | 7/2015 | Lee ....................... G02B 6/0038 |
| | | 362/613 |
| 2016/0341392 A1 | 11/2016 | Zelikovskaya et al. |
| 2018/0059318 A1* | 3/2018 | Nichol ................. G02B 6/0028 |
| 2018/0141493 A1* | 5/2018 | Salter ..................... G09F 13/18 |

* cited by examiner

PARTIAL METALLIZATION OF LIGHT GUIDES FOR A BINARY AESTHETIC

BACKGROUND

Field of the Disclosure

The present disclosure relates to lighting devices of automotive vehicles and their aesthetic appearance in lit and unlit states.

Description of the Related Art

Lighting devices of automotive vehicles traditionally comprise a light source, a reflecting surface, and a lens, wherein the reflecting surface is of a parabolic shape. When the lighting device is in an operative, or lit, state, light rays emitted from the light source are reflected by the reflecting surface and directed in a controlled direction through the lens. Often, the lens is a colored lens in order to communicate a specific instruction to an observer. When the lighting device is in a non-operative, or unlit, state, however, and when it may not be desirable to communicate such instruction, a subdued colored appearance remains as ambient light from outside the vehicle is reflected from the reflecting surface of the lighting device and returned through the colored lens.

Recently, interest in multi-colored lighting device states has grown. For example, it may be desirable that, when in a lit state, a rear lighting device is red, however, when in an unlit state, the rear lighting device is yellow. Efforts to modify lighting devices to accomplish this request are varied and include multi-component light guides. These approaches, however, are often limited by manufacturing complexity and transmission inefficiency, necessitating a new approach.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

The present disclosure relates to apparatuses and a method of a lighting device of an automotive vehicle.

According to an embodiment, the present disclosure relates to a lighting device of an automotive vehicle, comprising a light guide having one or more decoupling regions disposed on a rear surface, and a bezel, arranged relative to the light guide such that a front surface of the bezel is proximate the rear surface of the light guide, having one or more effecting facets disposed on the front surface, the one or more effecting facets having a first surface and a second surface, wherein an ambient light ray is reflected by one of the one or more effecting facets disposed on the front surface of the bezel, the reflected ambient light ray communicating a pre-determined color to an observer.

According to another embodiment, the present disclosure relates to a lighting device of an automotive vehicle, comprising a light guide, optically-coupled to at least one light source, having one or more decoupling regions disposed on a rear surface, and a bezel, arranged relative to the light guide such that a front surface of the bezel is proximate the rear surface of the light guide, having one or more effecting facets disposed on the front surface, the one or more effecting facets having a first surface and a second surface, wherein a light ray emitted by the at least one light source is reflected by one of the one or more effecting facets disposed on the front surface of the bezel, the reflected emitted light ray communicating a pre-determined color to an observer.

According to another embodiment, the present disclosure relates to a method of guiding light in a lighting device of an automotive vehicle, comprising refracting an ambient light through a light guide having one or more decoupling regions disposed on a rear surface, reflecting the refracted ambient light via one of one or more effecting facets having a first surface and a second surface and disposed on a front surface of a bezel, the bezel arranged relative to the light guide such that the front surface of the bezel is proximate the rear surface of the light guide, and refracting the reflected ambient light through the light guide, wherein the reflected ambient light communicates a pre-determined color to an observer.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

Figure 1:
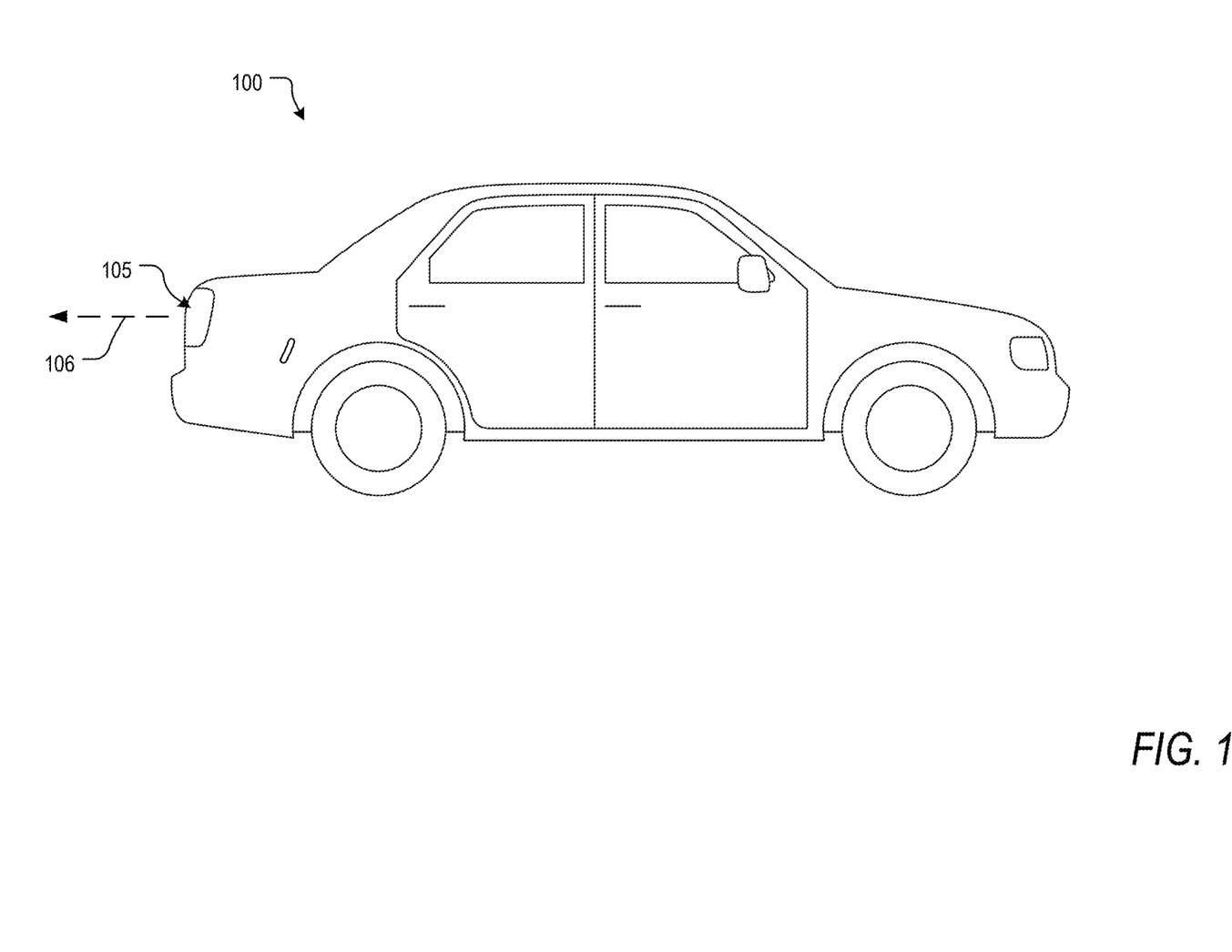
FIG. 1 is an illustration of an automotive vehicle, according to an exemplary embodiment of the present disclosure.

With reference to FIG. 1, the present disclosure is generally related to automotive lighting. More specifically, FIG. 1 illustrates an automotive vehicle 100 with a rear lighting device 105. It can be appreciated that the lighting device 105 is merely representative and can be one of a variety of lighting devices of the automotive vehicle including, but not limited to, dipped-beam lamps, main-beam lamps, front fog lamps, cornering lamps, daytime running lamps, parking lamps, direction indicators, tail lamps, and stop lamps. In an embodiment, the lighting device 105 can be mounted to the automotive vehicle 100 either vertically or horizontally, and other shapes of the lighting device 105 may be used as appropriate. In an example, the rear lighting device 105 is a traditional automotive lamp.

In another example, the rear lighting device 105 is a light guide. In producing a visual effect from a front surface of the light guide and similar to a lamp, along a visual axis of an observer 106, a remotely-positioned light source delivers light rays to a series of decoupling regions disposed on a rear surface of the light guide, wherein the front surface of the light guide is an external surface of the light guide. Light rays reflected from the decoupling regions may contact the opposing surface, or front surface, with an angle of incidence such that the light ray is transmitted through the front surface and into the ambient air along the visual axis of the observer 106. These transmitted light rays exit the light guide and become visible to the observer.

Recently, users have become interested in automotive lighting and/or signaling devices with advanced aesthetics. For example, it may be requested that a brake light appear red in a lit state but black in an unlit state, unlike current devices which may be brightly red in a lit state and dimly red or clear in an unlit state, the result of ambient light reflecting from the internal surfaces of the lighting device. Achieving the above-described aesthetic with traditional approaches, however, has resulted in cumbersome lighting devices employing, for example, multiple light sources or, in another example, inefficient internal geometries. An ideal approach addresses these shortcomings while providing a desired aesthetic.

Figure 2A:
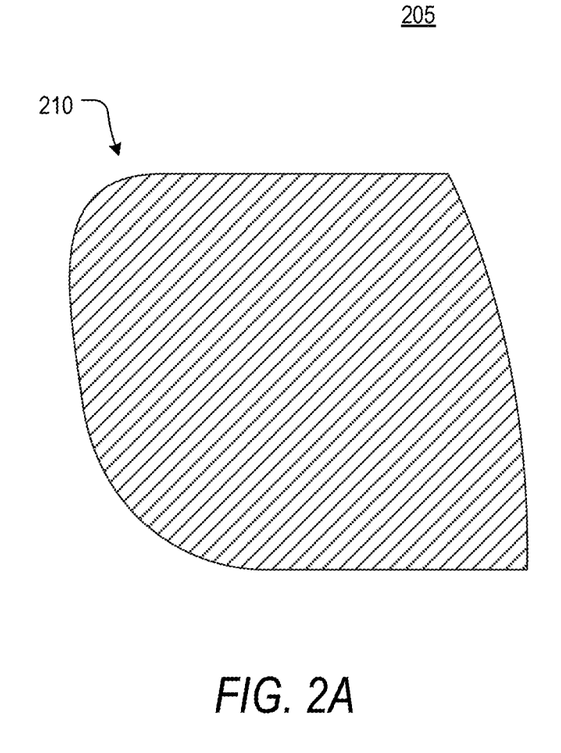
FIG. 2A is a schematic of a cross-sectional view of a rear lighting device of an automotive vehicle in a lit state, according to an exemplary embodiment of the present disclosure.
Figure 2B:
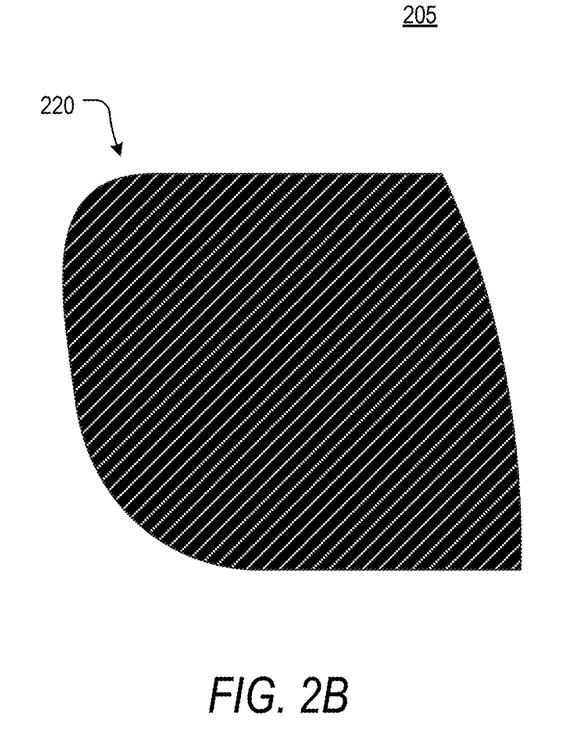
FIG. 2B is a schematic of a cross-sectional view of a rear lighting device of an automotive vehicle in an unlit state, according to an exemplary embodiment of the present disclosure.

To this end, FIG. 2A and FIG. 2B are schematics of a rear lighting device of an automotive vehicle in a lit state and unlit state, respectively. According to an embodiment, with reference to FIG. 2A, a vehicle light indicator 205 may be a light guide in a lit state 210. In an embodiment, in the lit state 210, an emitted light of a light source of the vehicle light indicator 205 may be of a color pre-determined by an end user and may be of a color selected from a group including but not limited to white, red, yellow, blue, green, orange, and purple. While a lit state 210 of a first pre-determined color may be desirable when the vehicle light indicator 205 is activated, as described above, it may also be desirable that an unlit state 220 of the vehicle light indicator 205 be of a second pre-determined color, as show in FIG. 2B. In order to achieve this multi-colored output, as later described, a structural addition to the lighting device, arranged relative to the light guide, is proposed.

Figure 3A:
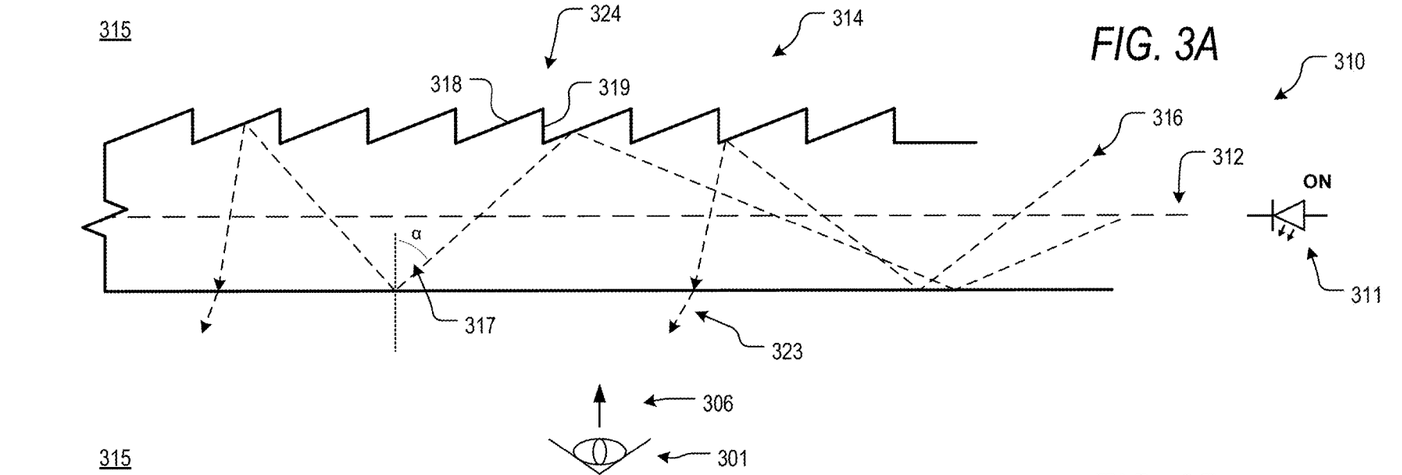
FIG. 3A is a schematic of a cross-sectional view of a light guide of a lighting device of an automotive vehicle in a lit state, according to an exemplary embodiment of the present disclosure.
Figure 3B:
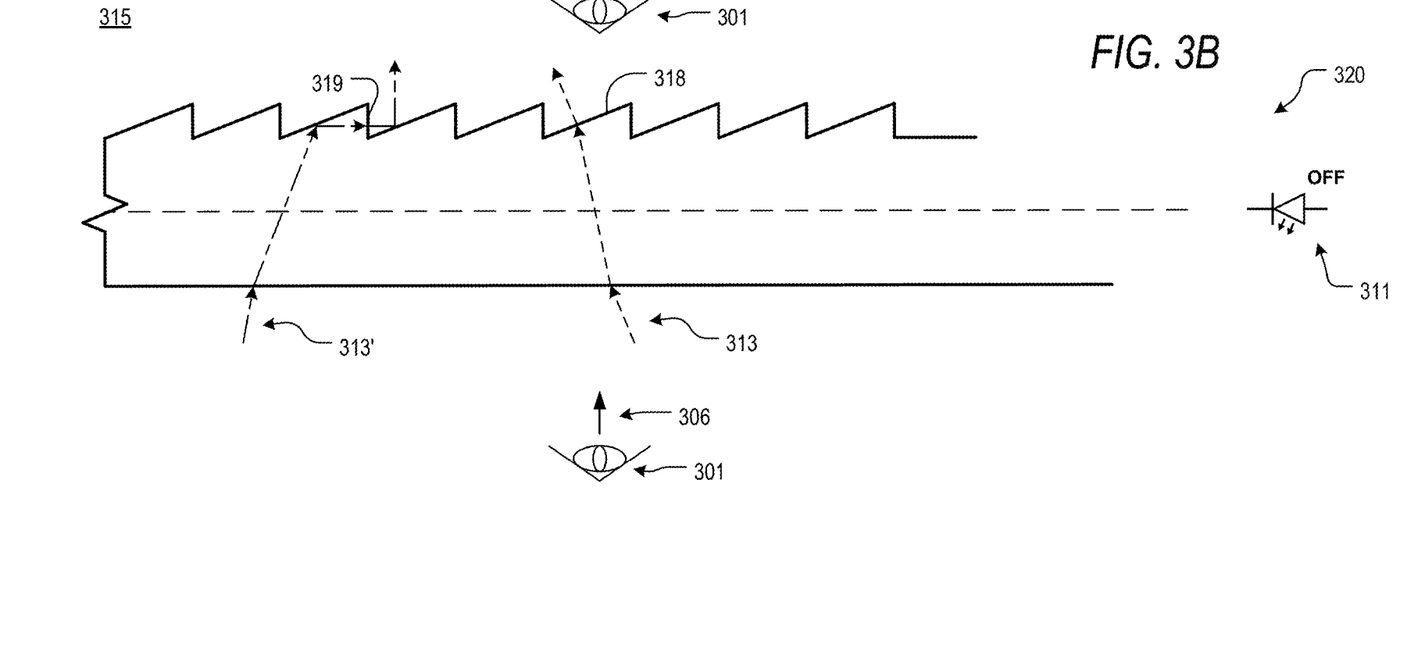
FIG. 3B is a schematic of a cross-sectional view of a light guide of a lighting device of an automotive vehicle in an unlit state, according to an exemplary embodiment of the present disclosure.

As introduction, FIG. 3A and FIG. 3B are schematics of a light guide of a lighting device of an automotive vehicle. Specifically, FIG. 3A and FIG. 3B reflect a lit state 310 and an unlit state 320, respectively. With respect to the FIG. 3A, a light source 311 is optically-coupled to a light guide 315 via an input face. The light source 311 may be one selected from a group including but not limited to a light emitting diode, an incandescent lamp, a high-intensity discharge lamp, and a neon lamp tube. In an example, the light source 311 is one or more light emitting diodes. Further, the one or more light emitting diodes may be white or more preferably correspond to the desired external appearance of the assembly, such as yellow, orange, or red. Additionally, the strength of each of the one or more light emitting diodes may range from below 1 lumen to 1000 lumen. However, it is to be understood that the strength of each of the one or more light emitting diodes may also exceed this range in other applications. In an embodiment, a plurality of light sources 311, disposed adjacent to a corresponding plurality of input faces, may be employed. In an example, a first light source 311 may be positioned at the input face of the light guide 315 and a second light source 311 may be positioned at a terminal face of the light guide 315. In a lit state 310, one or more of the plurality of light sources 311 may be active. In the lit state 310, emitted light rays from the light source 311 may be reflected by internal reflection faces of the light guide and directed substantially along a longitudinal axis 312 of the light guide.

According to an embodiment, the light guide 315 may be comprised of one or more decoupling regions 314 disposed along a rear surface of the light guide 315 and extending along the longitudinal axis 312 of the light guide 315. As light rays emitted by the light source 311 in the lit state 310 propagate substantially along the longitudinal axis 312 of the light pipe, reaching the one or more decoupling regions 314, a portion of the emitted light rays are decoupled and reflected at an angle that causes them to contact an opposing internal reflection face, or front surface, at an angle of incidence such that the emitted light rays exit the light guide 315.

According to an embodiment, each of the one or more decoupling regions 314 may be comprised of one or more reflecting facets 324. Each of the one or more reflecting facets 324 may be comprised of an active face 318 and a passive face 319. In an embodiment, the macrostructure of each of the one or more reflecting facets 324 may be dependent upon the design of the active face 318 and the passive face 319. The shape of the active face 318 and the shape of the passive face 319 may be of a shape appropriate for reflecting an emitted light ray in a pre-determined manner. For example, the active face 318 may be of a planar shape while the passive face 319 may be of a convex shape, or vice versa. Alternatively, both faces may be of the same shape. According to an embodiment, the active face 318 and the passive face 319 are substantially rectangular.

According to an exemplary embodiment of the present disclosure, a light ray 316 emitted from the light source 311 may enter the light guide 315 from an input face. In an embodiment, the emitted light ray 316 may be initially reflected by an internal reflection face. Initial reflection of the emitted light ray 316 is based upon an angle of contact, relative to a normal axis, of the emitted light ray 316 as it contacts the internal reflection face. This angle of contact, or angle of incidence 317, determines if the emitted light ray 316 will refract and exit the light guide 315 or be reflected internally. For example, if the angle of incidence 317 is less than a pre-determined value, the emitted light ray 316 will be refracted and leave the light guide 315. Otherwise, total internal reflection will occur, the emitted light ray 316 will be reflected back into the light guide 315, and it will continue propagating in a direction substantially along the longitudinal axis 312.

This phenomena is due to a difference in refractive index between the light guide 315 and surrounding ambient air that ensures the propagation of the emitted light rays 316 along the length of the light guide 315, by total internal reflection on one hand, and on the other hand, allows a portion of these emitted light rays 316 to leave the light guide 315 for lighting or other function.

According to an embodiment, the light guide 315 may be fabricated from polycarbonate and may be surrounded by ambient air. According to Snell-Descartes law, the limiting angle of incidence at this boundary is approximately 39°, wherein the refractive index of polycarbonate is ~1.6 and the refractive index of air is ~1. While polycarbonate may be employed in the present example, it should be appreciated that the light guide 315 may be manufactured from a variety of materials including but not limited to polymethylmethacrylate (refractive index ~1.5).

With this understanding, it can be observed that, according to an embodiment, initially, the emitted light ray 316 may contact a front surface of the light guide 316 at an angle of incidence greater than 39° (in the case of polycarbonate). The emitted light ray 316 may then be reflected into one of the reflecting facets 324 of the one or more decoupling regions 314 disposed on a rear surface of the light guide 315. Coming into contact with the active face 318, the emitted light ray 316 may be reflected back toward the front surface of the light guide 315. As the emitted light ray 316 again contacts the front surface of the light guide 315, this time at a steeper angle, it may be determined that the angle of incidence 317 with respect to a normal axis is less than the limiting angle of incidence. As a result, the emitted light ray 316 may be refracted 323 through the boundary and exit the light guide 315. The refracted light ray 323 may then become observable to an observer 301 along an observer line of sight 306. The refracted light ray 323 may exhibit the pre-determined color of the light source 311 such that the observer 301 is informed of a status of the vehicle.

The light guide 315 of FIG. 3B may be substantially similar to the light guide of FIG. 3A, though in an unlit state 320. In an example, the light source 311 may be inactive. According to an embodiment, an ambient light ray 313 including but not limited to, for example, solar energy, may come into contact with the front surface of the light guide 315 at an angle of incidence such that the ambient light ray 313 is refracted through the boundary and into the light guide 315. The refracted, ambient light ray 313 may then come into contact with an active face 318 of a reflecting facet of the one or more decoupling regions of the light guide 315. As a result of the angle of incidence of the refracted, ambient light ray 313 with the active face 318 of the reflecting facet being less than a limiting angle of incidence, the refracted, ambient light ray 313 may again be refracted through the active face 318 of the reflecting facet and exit through the rear surface of the light guide 315. In an embodiment, the twice refracted, ambient light ray 313 may be scattered and not recovered. In another embodiment, a rear component of the lighting device may then reflect the twice refracted, ambient light ray 313 back through the light guide 315 and into the field of view of an observer 301 along an observer line of sight 306, resulting in a visual perception of light that is the color of the light guide 315.

According to an embodiment, an ambient light ray 313' including but not limited to, for example, solar energy, may come into contact with the front surface of the light guide 315 at an angle of incidence such that the ambient light ray 313' is refracted through the boundary and into the light guide 315. The refracted, ambient light ray 313' may then come into contact with an active face of a reflecting facet of the one or more decoupling regions of the light guide 315. As a result of the angle of incidence of the refracted, ambient light ray 313' with the active face 318 of the reflecting facet being greater than a limiting angle of incidence, the refracted, ambient light ray 313 may be reflected by the active face toward a passive face 319 of the reflecting facet. In this instance, the angle of incidence of the refracted, ambient light ray 313' results in refraction through the rear surface of the light guide 315. In an embodiment, the twice refracted, ambient light ray 313' may be scattered and not recovered. In another embodiment, and similar to the twice refracted, ambient light ray 313', a rear component of the lighting device may then reflect the twice refracted, ambient light ray 313' back through the light guide 315 and into the field of view of the observer 301 along the observer line of sight 306, resulting in a visual perception of light that is the color of the light guide 315.

Figure 4:
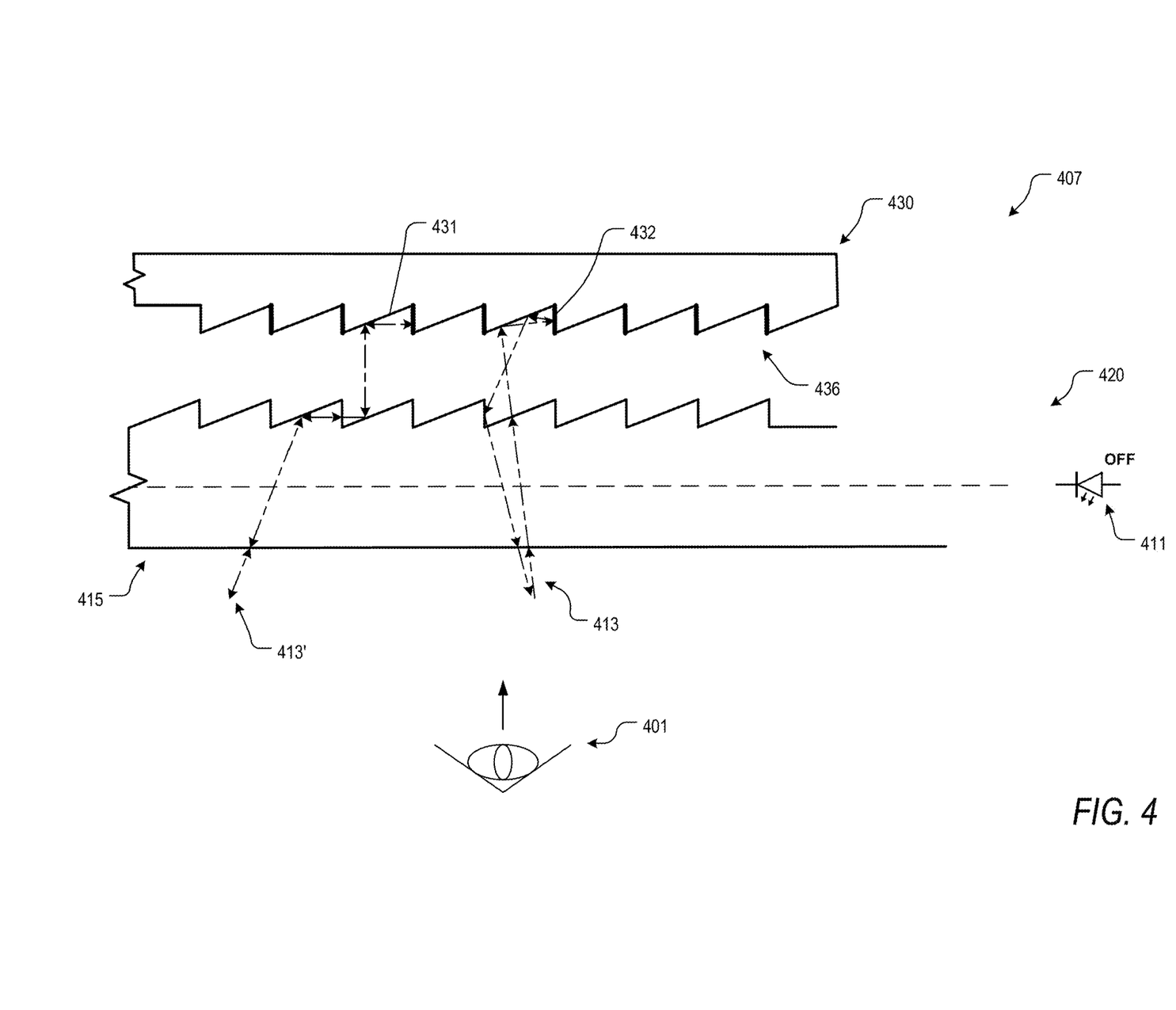
FIG. 4 is a schematic of a cross-sectional view of a vehicle indicator light assembly in an unlit state, according to an exemplary embodiment of the present disclosure.

In the above-described situations, a plurality of twice refracted, ambient light rays 313, 313' are returned to the visual field of the observer 301 with a color similar to that of the color of the lit state of the lighting device, or the inherent color of the light guide 315. As mentioned, user demands have led to interest in recovering twice refracted, ambient light rays 313, 313' such that they may be returned to the visual field of the observer 301 with a pre-determined color. In order to accomplish this feature, FIG. 4 is a schematic of a lighting device assembly in an unlit state, according to an exemplary embodiment of the present disclosure. It is to be understood that only the relevant components of the lighting device assembly are discussed below, but that other components may be needed to construct an operational light assembly.

According to an embodiment, a lighting device assembly is a vehicle indicator light assembly (VILA) 407. The VILA 407 comprises a light source 411 optically-coupled to an input face of a light guide 415, the light guide 415 comprising one or more reflecting facets of one or more decoupling regions, and a functionalized bezel 430 comprising a corresponding one or more effecting facets 436 on a front surface, each of the corresponding one or more effecting facets 436 having a first surface and a second surface. The first surface and second surface may be of dimensions and orientations such that a twice refracted, ambient light is returned to a visual field of an observer 401. In an embodiment, the first surface is a metallized surface 431 and the second surface is an opaque surface 432.

According to an embodiment, the light guide 415 may be fabricated from a material selected from a group of translucent thermoplastic materials including but not limited to acrylics and polycarbonates. The light guide 415 may be fabricated via a method selected from a group including but not limited to injection molding, machining, and three-dimensional printing. Similarly, the functionalized bezel 430 may be fabricated from a material selected from a group of materials including but not limited to acrylics and polycarbonates. Further, the functionalized bezel 430 may be fabricated via a method selected from a group including but not limited to injection molding, machining, and three-dimensional printing. In an example, the light guide 415 and the functionalized bezel 430 are fabricated via identical methods with identical materials. It should be appreciated that other suitable materials, such as those found in the List of Acceptable Plastics for Optical Lenses and Reflex Reflectors Used on Motor Vehicles published by the Automotive Manufacturers Equipment Compliance Agency, incorporated herein by reference.

According to an embodiment, the functionalized bezel 430 may be further modified such that a first surface of each of the one or more effecting facets 436 may be a substantially reflecting face and a second surface of each of the one or more effecting facets 436 may be a substantially filtering face. In an embodiment, the first surface may be a highly reflective face. In an example, the first surface may be a metallized surface 431. In an embodiment, the second surface may be an optical filter. In an example, the second surface may be an opaque surface 432 configured to be a monochromatic optical filter. The opaque surface 432 may be configured to reflect a pre-determined color.

According to an embodiment, the functionalized bezel 430 and the light guide 415 of the VILA 407 may be fabricated independently according to one or more of the above-described methods. Alternatively, the functionalized bezel 430 and the light guide 415 of the VILA 407 may be formed integrally during a single fabrication process selected from the group of above-described fabrication methods.

According to an embodiment, the functionalized bezel 430 and the light guide 415 of the VILA 407 are arranged such that twice refracted, ambient light is reflected from one of one or more effecting facets 436 of the functionalized bezel 430 and returned to the visual field of the observer 401 through the light guide 415. In an embodiment, the one or more effecting facets 436 of the functionalized bezel 430 and the reflecting facets of the one or more decoupling regions of the light guide 415 are fabricated such that corresponding features form a negative component and a positive component. In another embodiment, corresponding features are fabricated independently in order to modify the reflective output of the VILA 407 via reflection from the functionalized bezel 430.

According to an embodiment, the functionalized bezel 430 and the light guide 415 may be arranged such that a passive face of the light guide 415 and an opaque surface 432 of the functionalized bezel 430 are parallel. In another embodiment, the passive face of the light guide 415 and the opaque surface 432 of the functionalized bezel 430 are collinear. It can be appreciated that the faces of the light guide 415 and the surfaces of the functionalized bezel 430 may be arranged in a variety of planar orientations that may include but are not limited to parallel orientations or intersecting orientations.

Moreover, the relative arrangement of the functionalized bezel 430 and the light guide 415 is determined in accordance with a desired output of the VILA 407 and an expected direction of an ambient light. Specifically, the relative arrangement is such that an ambient light ray 413 may be twice refracted through the light guide 415, fully reflected or partially reflected by the opaque surface 432, and returned to the visual field of the observer 401. It can be appreciated that the relative arrangement of the functionalized bezel 430 and the light guide 415 is further determined in accordance with an expected viewing angle of an observer. In an example, the functionalized bezel 430 and the light guide 415 are arranged such that scattered light escaping the light guide 415 may be reflected out of the lighting device while, concurrently, a viewing angle of an observer outside the lighting device will perceive a desired color of the opaque surface 432 of the functionalized bezel 430.

To this end, according to an embodiment, the VILA 407, with an inactive light source 411, may be in an unlit state 420. An ambient light ray 413 including but not limited to, for example, solar energy, may come into contact with the front surface of the light guide 415 at an angle of incidence such that the ambient light ray 413 is refracted through the boundary and into the light guide 415. The refracted, ambient light ray 413 may then come into contact with an active face of a reflecting facet of one of the one or more decoupling regions of the light guide 415. As a result of the angle of incidence of the refracted, ambient light ray 413 with the active face of the reflecting facet being less than a limiting angle of incidence, the refracted, ambient light ray 413 may again be refracted through the active face 418 of the reflecting facet and exit through the rear surface of the light guide 415.

In present lighting devices, the twice refracted, ambient light ray 413 may be scattered from a rear surface of the light guide 415 and not recovered or, ultimately, reflected back to the visual field of the observer 401 with a similar color to a lit state, or with a color mimicking the inherent color of the light guide 415.

In an exemplary embodiment of the present disclosure, however, the twice refracted, ambient light ray 413 may be directed toward a functionalized bezel 430. The twice refracted, ambient light ray 413 may come into contact with one of one or more effecting facets 436 of the functionalized bezel 430. According to an embodiment, the twice refracted, ambient light ray 413 may then contact a metallized surface 431 of one of the one or more effecting facets 436, thus being reflected toward an opaque surface 432 of one of the one or more effecting facets 436. Following contact with the opaque surface 432, the now reflected, filtered ambient light ray 413 is returned to the metallized surface 431 and reflected, again, back through the rear surface of the light guide 415, exiting the light guide 415 through the front surface in a manner substantially similar to the inverse of the entry path. In an embodiment, the opaque surface 432 of one of the one or more effecting facets 436 may be a colored surface intended to reflect a single color to be viewed by an observer. In an example, the opaque surface 432 may be a monochromatic optical filter. In another embodiment, the opaque surface 432 of one of the one or more effecting facets 436 may be patterned such that an intended visual display is reflected.

Upon exiting the light guide 415, the reflected, filtered ambient light ray 413 may present a single color to the user. In an example where the opaque surface 432 is black and when the VILA 407 is in an unlit state 420, the vehicle indicator light may appear black.

According to an exemplary embodiment, an ambient light ray 413' may follow a substantially similar path to that of the ambient light ray 413. Specifically, an ambient light ray 413' including but not limited to, for example, solar energy, may come into contact with the front surface of the light guide 415 at an angle of incidence such that the ambient light ray 413' is refracted through the boundary and into the light guide 415. The refracted, ambient light ray 413' may then come into contact with an active face of a reflecting facet of one of the one or more decoupling regions of the light guide 415. As a result of the angle of incidence of the refracted, ambient light ray 413' with the active face of the reflecting facet being greater than a limiting angle of incidence, the refracted ambient light right 413' may be reflected by the active face toward a passive face of the reflecting facet. In this instance, the angle of incidence of the refracted, ambient light ray 413' results in refraction through the rear surface of the light guide 415.

As mentioned, in present lighting devices, the twice refracted, ambient light ray 413' may be scattered from a rear surface of the light guide 415 and not recovered or, ultimately, reflected back to the visual field of the observer 401 with a similar color to a lit state or with a color mimicking the inherent color the light guide 415.

In an exemplary embodiment of the present disclosure, however, the twice refracted, ambient light ray 413' may be directed toward a functionalized bezel 430. The twice refracted, ambient light ray 413' may come into contact with one of one or more effecting facets 436 of the functionalized bezel 430. According to an embodiment, the twice refracted, ambient light ray 413' may then contact a metallized surface 431 of one of the one or more effecting facets 436, thus being reflected toward an opaque surface 432 of one of the one or more effecting facets 436. Following contact with the opaque surface 432, the now reflected, filtered ambient light ray 413' is returned to the metallized surface 431 and reflected, again, back through the rear surface of the light guide 415, exiting the light guide 415 through the front surface in a manner substantially similar to the inverse of the entry path. In an embodiment, the opaque surface 432 of one of the one or more effecting facets 436 may be a colored surface intended to reflect a single color to be viewed by an observer. In an example, the opaque surface 432 may be a monochromatic optical filter. In another embodiment, the opaque surface 432 of one of the one or more effecting facets 436 may be patterned such that an intended visual display is reflected.

Figure 5:
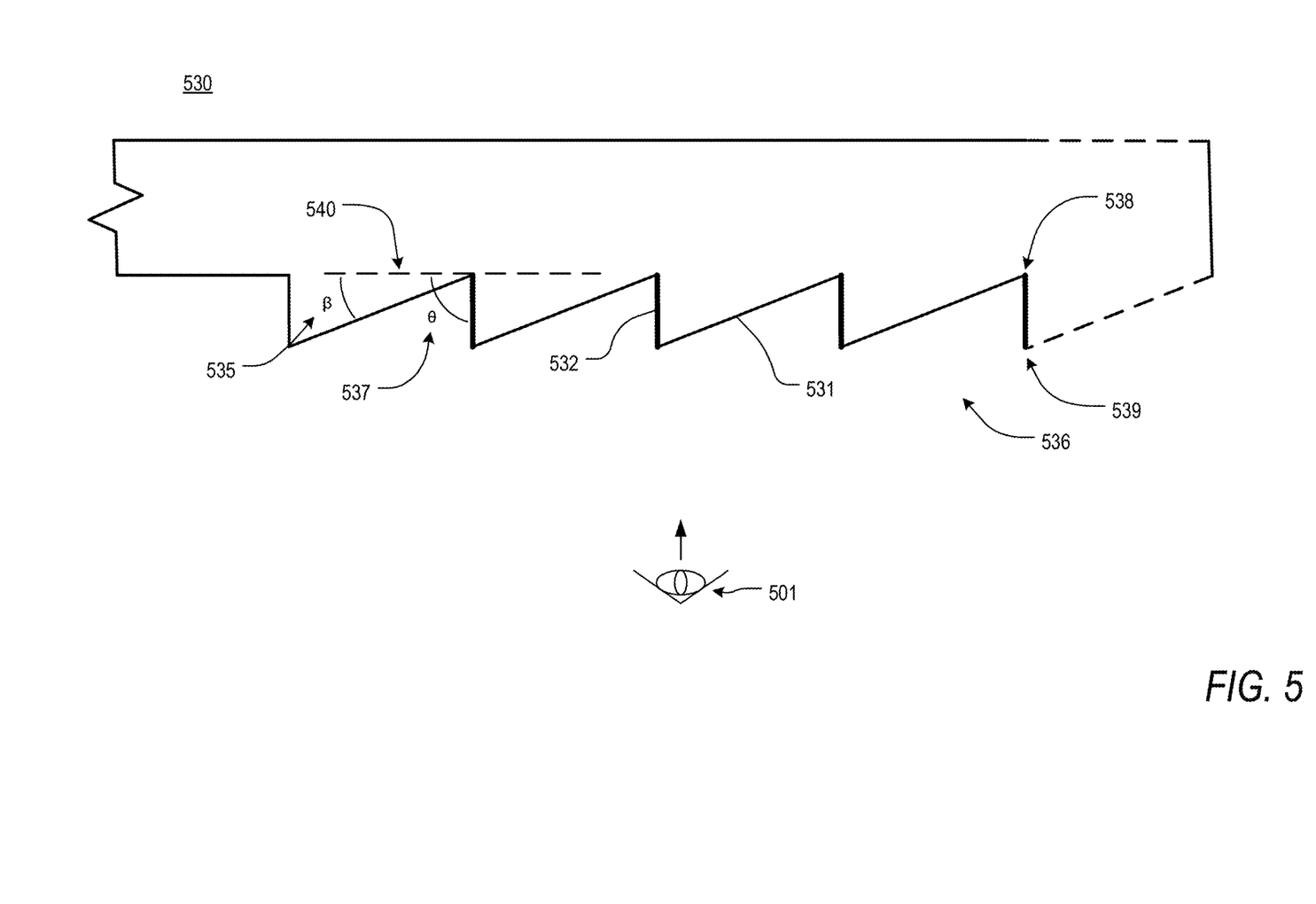
FIG. 5 is a schematic of an aspect of a cross-sectional view of a functionalized bezel of a vehicle indicator light assembly, according to an exemplary embodiment of the present disclosure.

According to an embodiment, an intended visual display is achieved, in part, through the dimensional design of the one or more effecting facets of the functionalized bezel. To this end, FIG. 5 is a schematic of a dimensional aspect of a functionalized bezel of a VILA. In an exemplary embodiment of the present disclosure, a functionalized bezel 530 comprises one or more effecting facets 536. Each of the one or more effecting facets 536 comprises a first, metallized surface 531 and a second, opaque surface 532.

The shape of the metallized surface 531 and the shape of the opaque surface 532 may be of a shape appropriate for reflecting a twice refracted, emitted light ray in a predetermined manner. For example, the metallized surface 531 may be of a planar shape while the opaque surface 532 may be of a convex shape, or vice versa. Alternatively, both faces may be of the same shape. According to an embodiment, the metallized surface 531 and the opaque surface 532 are substantially rectangular.

According to an embodiment, the metallized surface 531 may form a metallized surface angle 535 with a reference axis 540. Similarly, the opaque surface 532 may form an opaque surface angle 537 with the reference axis 540. The metallized surface angle 535 and the opaque surface angle 537 may be modified according to a desired ambient light reflectance with respect to a line of sight of an observer 501 and in context of the design of the one or more decoupling regions of the light guide. In an embodiment, the metallized surface angle 535 and the opaque surface angle 537 may be modified along the reference axis 540 of the functionalized bezel 530 such that adjacent effecting facets of the one or more effecting facets 536 may have varying angles.

According to an exemplary embodiment of the opaque surface 532, the opaque surface angle 537 may be between 45° and 135°. In another embodiment, the opaque surface angle 537 may be between 80° and 100°. In an example, the opaque surface angle 537 may be 90°. In an exemplary embodiment of the metallized surface 531, the metallized surface angle 535 may be between 0° and 135°. In another embodiment, the metallized surface angle 535 may be between 30° and 60°. In an example, the metallized surface angle 535 may be 45°.

According to an exemplary embodiment of the functionalized bezel 530, a difference between the opaque surface angle 537 and the metallized surface angle 535 may be between 5° and 170°. In another embodiment, the difference between the opaque surface angle 537 and the metallized surface angle 535 may be between 30° and 60°. In an example, the difference between the opaque surface angle 537 and the metallized surface angle 535 may be 45°.

According to another embodiment of the functionalized bezel 530, an angle formed between a visual axis of the observer 501 and the metallized surface 531 may be between 0° and 135°. In another embodiment, the angle formed between the visual axis of the observer 501 and the metallized surface 531 may be between 30° and 60°. In an example, the angle formed between the visual axis of the observer 501 and the metallized surface 531 may be 45°.

Further, the above-described angles may be modified in accordance with manufacturing requirements. In an embodiment, the functionalized bezel 530 may be fabricated by injection molding. In order to facilitate extraction of the functionalized bezel 530 following molding, the opaque surface 532 may be drafted. In an example, the draft angle of the opaque surface 532 may result in an opaque surface angle 537 greater than 90°. More specifically, the draft angle of the opaque surface 532 may result in an opaque surface angle 537 of 95°.

According to an embodiment, a length dimension of each of the surfaces of one of the one or more effecting facets 536, defined as a distance from a vertex 538 to an adjacent apex 539, may be determined according to a desired ambient light reflectance with respect to the line of sight of the observer 501 in context of the design of the one or more decoupling regions of the light guide. Further, the length dimension of each of the surfaces of one of the one or more effecting facets may vary along the reference axis 540 of the functionalized bezel 630 such that the length dimension of successive surfaces between each of the one or more effecting facets 536 is different.

In an exemplary embodiment, a length dimension of the opaque surface 532, defined as the distance between the vertex 538 and the apex 539, may be between 0.1 mm to 0.4 mm. In another embodiment, a length dimension of the metallized surface 531, defined as the distance between the vertex 538 of a first effecting facet and the apex 539 of a second effecting facet, may be between 0.4 mm and 1.0 mm.

In another exemplary embodiment, the length dimension of the metallized surface 531 may be equal to the length dimension of the opaque surface 532. Moreover, with respect to a longitudinal axis of an automotive vehicle, the metallized surface 531 may be at a 45 degree angle and the opaque surface 532 may be at a 0 degree angle, or in another instance, a 90 degree angle. It can be appreciated that the angle of the metallized surface 531 and the opaque surface 532 may vary from the above-described values.

Figure 6A:
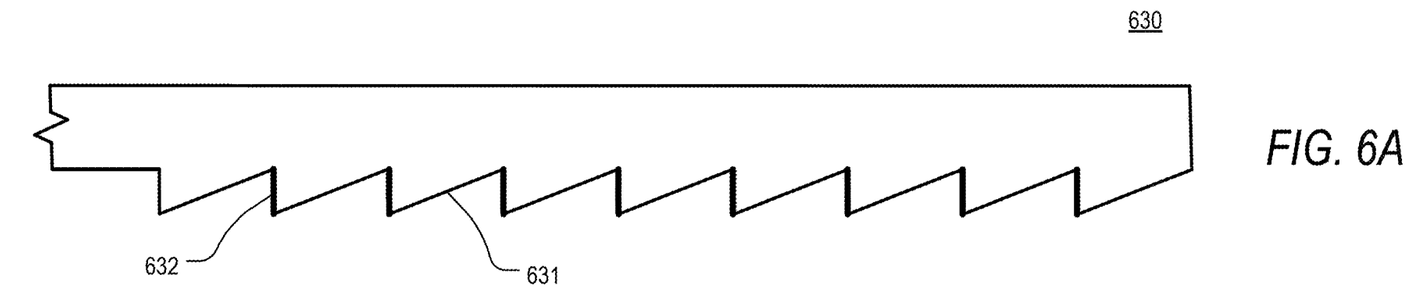
FIG. 6A is a schematic of a cross-sectional view of a functionalized bezel of a vehicle indicator light assembly, according to an exemplary embodiment of the present disclosure.
Figure 6B:
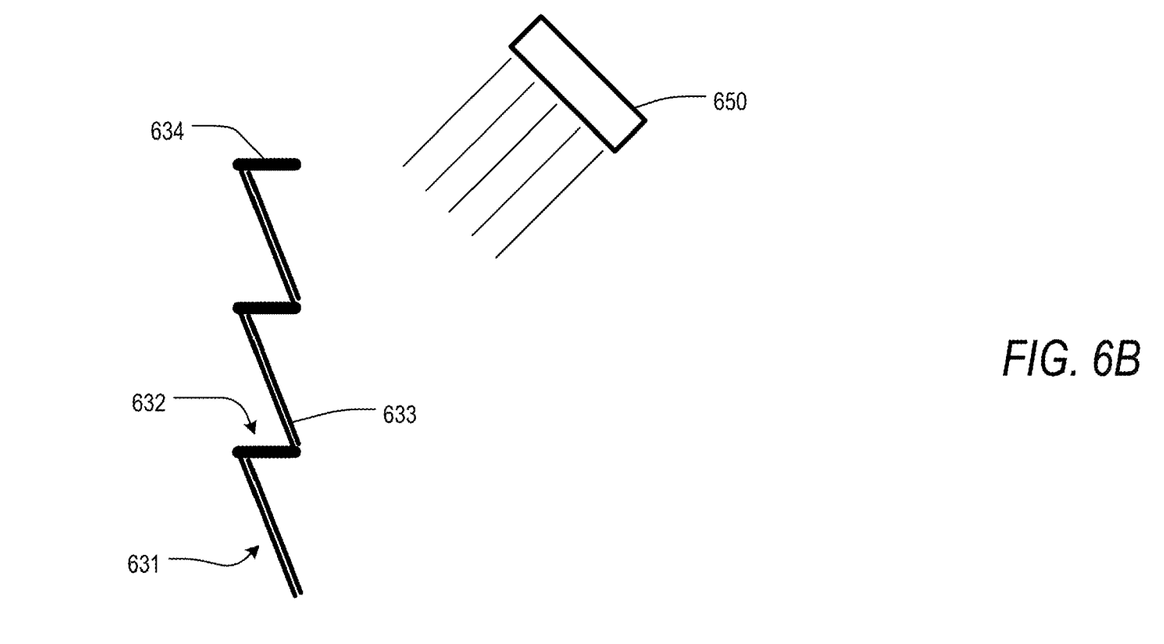
FIG. 6B is a schematic of an aspect of a cross-sectional view of a functionalized bezel of a vehicle indicator light assembly, according to an exemplary embodiment of the present disclosure.

In order to create the functionality of the bezel, a method of functionalization of the metallized surface need be employed. To this end, FIG. 6A and FIG. 6B are schematics of a cross-section of a functionalized bezel of a VILA. With reference to FIG. 6A, the functionalized bezel 630 comprises a metallized surface 632 and an opaque surface 631 of an effecting facet.

According to an embodiment, with reference to FIG. 6B, the functionalized bezel 630 may be further modified such that a first surface of each of the one or more effecting facets may be a substantially reflecting face and a second surface of each of the one or more effecting facets may be a substantially filtering face. In an embodiment, the first surface may be a highly reflective face. In an example, the first surface may be a metallized surface 631. The metallized surface 631 may be achieved via a method selected from a group including but not limited to physical vapor deposition including sputter coating, thermal physical vapor deposition, electron-beam physical vapor deposition, atomic layer deposition, chemical vapor deposition, arc and flame spraying, and electroplating. The metallized surface 631 may comprise a material selected from a group including but not limited to aluminum, zinc, nickel, chromium, gold, palladium, germanium, copper, silver, tungsten, platinum, tantalum, and alloys thereof. Metallization 633 of the metallized surface 631 may be a complete metallization or a partial metallization, according to a desired reflectivity of the metallized surface 631. In an embodiment, metallization 633 may be controlled such that a percentage of deposition coverage or deposition thickness may be pre-determined. In an exemplary embodiment, metallization 633 may be controlled such that reflectivity of the metallized surface 631 is between 1% and 100%. In another exemplary embodiment, metallization 633 may be controlled such that reflectivity of the metallized surface 631 is between 10% and 90%. In an example, metallization 633 may be controlled such that reflectivity of the metallized surface 631 is 15%.

In an embodiment, the second surface may be an optical filter. In an example, the second surface may be an opaque surface 632 configured to be a monochromatic optical filter. The opaque surface 632 may be configured to reflect a pre-determined color. In an exemplary embodiment, the opaque surface 632 is achieved during fabrication of the functionalized bezel 630, generally. For instance, the dimensions, angles, opacity, and color of each surface of each of the effecting facets, including the opaque surface 632, may be formed during fabrication of the functionalized bezel 630. In another exemplary embodiment, the opaque surface 632 may be achieved subsequent to fabrication of the functionalized bezel 630 via a method selected from a variety of methods including but not limited to brushing, dipping, flowing, spraying, and vacuum metallization. According to an embodiment, opacity 634 of the opaque surface 632 may be adjusted such that complete opacity or partial opacity is achieved. In an embodiment, opacity 634 may be controlled such that a percentage of coverage or thickness may be pre-determined.

In an example of a metallization process, a physical deposition method may be employed. Specifically, the physical deposition method may be a sputter deposition method. To this end, a functionalized bezel 630 may be arranged relative to a sputter deposition source 650, the arrangement forming an angle between an axis of a projected output of the sputter deposition source 650 and an axis of the target, or functionalized bezel 630.

According to an embodiment, the relative arrangement of the functionalized bezel 630 and the sputter deposition source 650 is such that, as shown in FIG. 6B, only the first surface, or metallized surface 631, is targeted. In another example, the relative arrangement of the functionalized bezel 630 and the sputter deposition source 650 is such that both the first surface, or metallized surface 631, and the second surface, or opaque surface 632, are targeted.

According to an embodiment, wherein the metallized surface 631 and the opaque surface 632 are targeted concurrently, an additional step may be required in order to remove metal from the opaque surface 632. In this instance, a method for metal removal may be selected from a group including but not limited to laser ablation and etching. The additional step may be applied to the second surface of the effecting facet in order to fully reveal or partially reveal the opaque surface 632, as directed by an intended visual output to an observer.

Figure 7:
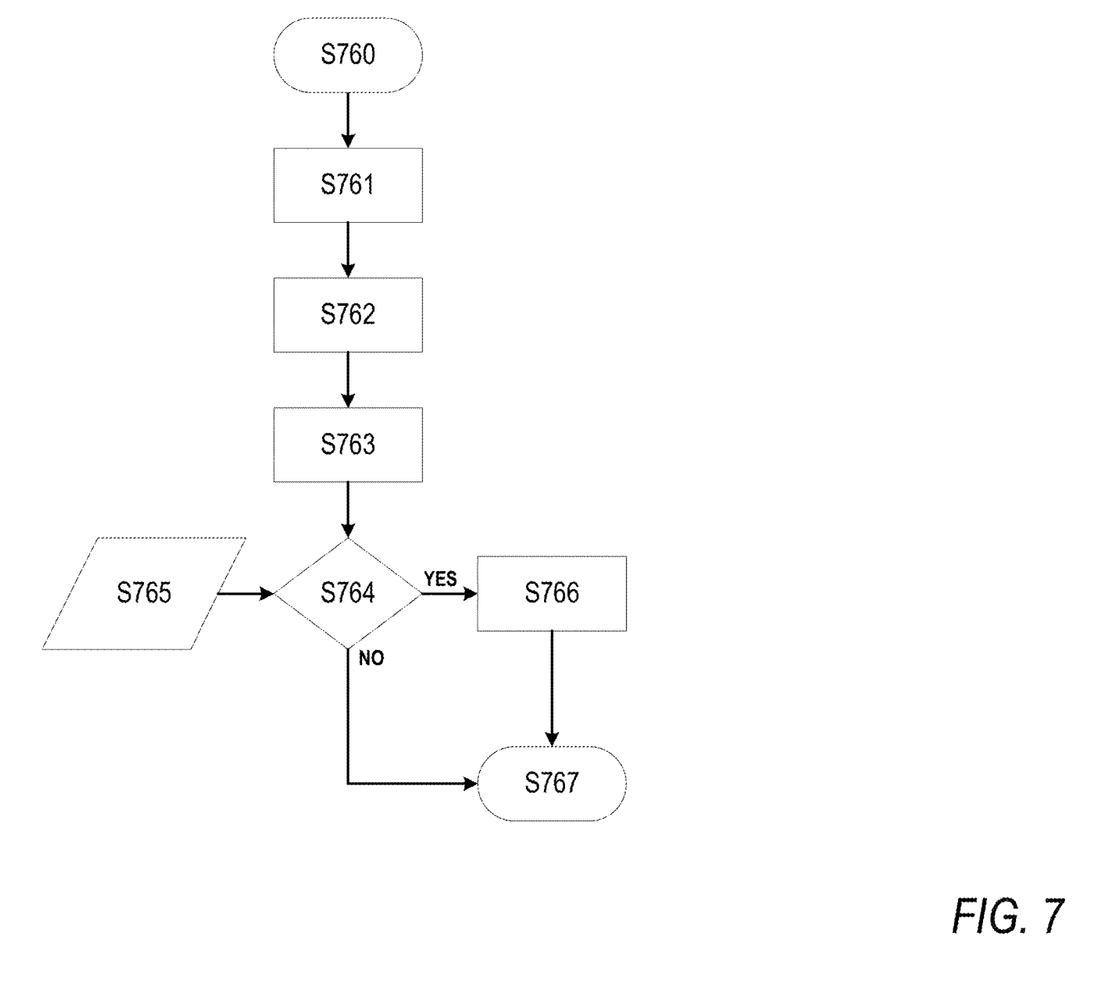
FIG. 7 is a flowchart of a method of functionalizing a functionalized bezel of a vehicle indicator light assembly, according to an exemplary embodiment of the present disclosure.

The above-describe process is described in detail below. To this end, FIG. 7 is a flowchart of a method of functionalizing a bezel of a VILA, according to an exemplary embodiment of the present disclosure. First, a bezel may be fabricated via an above-described method, for instance, injection molding S760. An intended color of an opaque surface of an effecting facet may be incorporated into a plastic feed during injection molding. Next, a relative angle between an axis of a project output of a sputter deposition source and an axis of the target, or bezel, is selected S761 in order to produce a desired sputter deposition pattern. With the relative angle of sputter deposition selected, the metal type and length of time for metallization may be selected S762. In selecting the metal type and length of time for metallization, the intended reflectivity of a metallized surface of the effecting facet can be modulated. For example, increasing the length of time for metallization may increase coverage and/or thickness of a metallization, thereby increasing reflectivity. Further, in another example, switching from one metal to another may change the surface roughness of the metallized surface, pursuant to the sputter deposition parameters of the metal, resulting in increased or decreased reflectivity of the metallized surface. Following initiation and completion of metallization according to the selected parameters S763, an evaluation of the surfaces of the effecting facet of the functionalized bezel may be performed in order to determine if metal removal is required S764. In the context of acquired data S765 relating to surface roughness, metallization coverage and metallization thickness, a determination of reflectivity and thus, of the necessity for metal removal, may be made. If it is determined that metallization has been isolated to the metallized surface, functionalization of the functionalized bezel is complete S767. Alternatively, if it is determined that the reflectivity of the opaque surface is above a pre-determined threshold, metal removal via an above-described method, for instance, laser ablation, is required S766 and is performed. Upon metal removal via laser ablation, or similar approach, the functionalized bezel may be implemented in a VILA.

Figure 8:
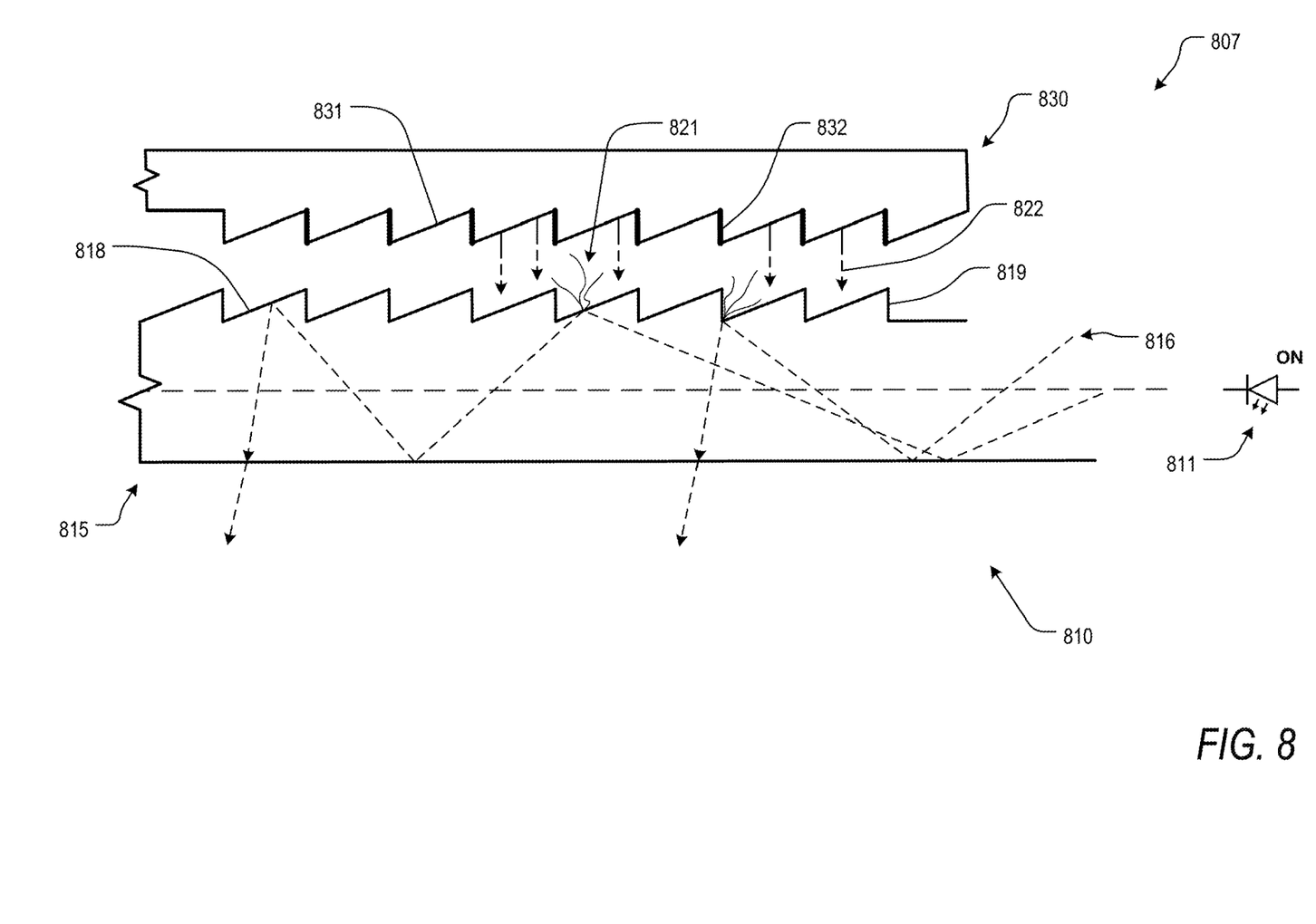
FIG. 8 is a schematic of a vehicle indicator light assembly in a lit state, according to an exemplary embodiment of the present disclosure.

In addition to controlling the visual output of a VILA in an unlit state, the present disclosure describes an approach for improving efficiency and clarity of a visual output of the VILA in a lit state. FIG. 8 is a schematic of a VILA 807 in a lit state 810. According to an exemplary embodiment of the present disclosure, a light ray 816 emitted from an active light source 811 may enter a light guide 815 from an input face. In an embodiment, the emitted light ray 816 may be initially reflected by an internal reflection face. Initial reflection of the emitted light ray 816 is based upon an angle of contact, relative to a normal axis, of the emitted light ray 316 as it contacts the internal reflection face. For example, if the angle of incidence is less than a pre-determined value, the emitted light ray 816 will be refracted and leave the light guide 815. Otherwise, total internal reflection will occur, the emitted light ray 816 will be reflected back into the light guide 815, and will continue propagating in a direction substantially along a longitudinal axis of the light guide 815. With this understanding, it can be observed that, according to an embodiment, initially, the emitted light ray 816 may contact a front surface of the light guide 816 at an angle of incidence greater than a pre-determined value. The emitted light ray 816 may therefore be reflected into either an active face 818 or a passive face 819 of the reflecting facets of the one or more decoupling regions disposed on a rear surface of the light guide 815. Coming into contact with the active face 818, the emitted light ray 816 may be reflected back toward the front surface of the light guide 815. As the emitted light ray 816 again contacts the front surface of the light guide 815, this time at a steeper angle, it may be determined that the angle of incidence with respect to a normal axis is less than the limiting angle of incidence. As a result, the emitted light ray 816 may be refracted through the boundary and exit the light guide 815.

In another embodiment, a portion of the emitted light ray 816 contacting either the active face 818 or the passive face 819 of the reflecting facet is scattered through the boundary of the rear surface of the light guide 815. With traditional approaches, in such instances, with the lighting device in a lit state, the scattered portion of the emitted light ray may not be recovered and may escape to the internal architecture of the lighting device. However, according to an embodiment of the present disclosure, the scattered portion of the emitted light ray 821 may be recovered by a functionalized bezel 830. In an embodiment, the scatter portion of the emitted light ray 821 may contact a metallized surface 831 or an opaque surface 832 of the functionalized bezel 830 and reflected back to the light guide 815 and, ultimately, the visual field of an observer.

According to an embodiment, recovered light rays 822 may mimic an intended color of the VILA 807 in a lit state 810. In another embodiment, recovered light rays 822 may mimic the color of the opaque surface 832, adding depth and clarity to the visual field of the observer.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A lighting device of an automotive vehicle, comprising:
   a light guide, optically-coupled to a light source, having one or more decoupling regions disposed on a rear surface of the light guide, a front surface of the light guide facing an external environment of the automotive vehicle; and
   a bezel arranged relative to the rear surface of the light guide such that a front surface of the bezel is immediately adjacent the rear surface of the light guide, the bezel including one or more effecting facets disposed on the front surface of the bezel, each effecting facet of the one or more effecting facets including a first surface and a second surface, wherein
   the first surface of each effecting facet of the one or more effecting facets of the bezel is a metallized surface having a pre-determined reflectivity, and
   ambient light rays, refracted through the light guide from the external environment of the automotive vehicle, are reflected by the one or more effecting facets disposed on the front surface of the bezel to produce reflected ambient light rays, the reflected ambient light rays communicating, to the external environment of the automotive vehicle, a pre-determined color corresponding to a color of the second surface of each effecting facet of the one or more effecting facets.

2. The lighting device according to claim 1, wherein the second surface of each effecting facet of the one or more effecting facets of the bezel is an opaque surface.

3. The lighting device according to claim 1, wherein a passive surface of each of the one or more decoupling regions disposed on the rear surface of the light guide is collinear with the second surface of a corresponding one of the one or more effecting facets disposed on the front surface of the bezel.

4. The lighting device according to claim 1, wherein an angle formed between the first surface of each effecting facet of the one or more effecting facets and the second surface of each effecting facet of the one or more effecting facets is 45 degrees.

5. A lighting device of an automotive vehicle, comprising:
   a light guide, optically-coupled to a light source, having one or more decoupling regions disposed on a rear surface of the light guide, a front surface of the light guide facing an external environment of the automotive vehicle; and
   a bezel arranged relative to the rear surface of the light guide such that a front surface of the bezel is immediately adjacent the rear surface of the light guide, the bezel including one or more effecting facets disposed on the front surface of the bezel, each effecting facet of the one or more effecting facets including a first surface and a second surface, wherein
   the first surface of each effecting facet of the one or more effecting facets of the bezel is a metallized surface having a pre-determined reflectivity,
   a passive surface of each of the one or more decoupling regions disposed on the rear surface of the light guide is collinear with the second surface of a corresponding one of the one or more effecting facets disposed on the front surface of the bezel, and
   light rays emitted by the light source and refracted through the rear surface of the light guide are reflected by the one or more effecting facets disposed on the front surface of the bezel to produce reflected emitted light rays, the reflected emitted light rays communicating, to the external environment of the automotive vehicle, a pre-determined color corresponding to a color of the second surface of each effecting facet of the one or more effecting facets.

6. The lighting device according to claim 5, wherein the second surface of each effecting facet of the one or more effecting facets of the bezel is an opaque surface.

7. The lighting device according to claim 5, wherein an angle formed between the first surface of each effecting facet of the one or more effecting facets and the second surface of each effecting facet of the one or more effecting facets is 45 degrees.

8. The lighting device according to claim 5, wherein the light source is a light emitting diode.

9. A method of guiding light in a lighting device of an automotive vehicle, comprising:
   refracting ambient light rays through a light guide to produce refracted ambient light rays, the light guide being optically-coupled to a light source and having a front surface facing an external environment of the automotive vehicle and a rear surface having one or more decoupling regions disposed thereon;
   reflecting the refracted ambient light rays via one or more effecting facets to produce reflected ambient light rays, each effecting facet of the one or more effecting facets having a first surface and a second surface, the one or more effecting facets being disposed on a front surface of a bezel arranged relative to the light guide such that the front surface of the bezel is immediately adjacent the rear surface of the light guide; and
   refracting the reflected ambient light rays through the light guide and toward the external environment of the automotive vehicle to produce refracted reflected ambient light rays, wherein
   the first surface of each effecting facet of the one or more effecting facets of the bezel is a metallized surface, and
   the refracted reflected ambient light rays communicate, to the external environment of the automotive vehicle, a pre-determined color corresponding to the second surface of each effecting facet of the one or more effecting facets.

10. The method of the lighting device according to claim 9, wherein the second surface of each effecting facet of the one or more effecting facets of the bezel is an opaque surface.

11. The method of the lighting device according to claim 9, wherein a passive surface of each of the one or more decoupling regions disposed on the rear surface of the light guide is collinear with the second surface of a corresponding one of the one or more effecting facets disposed on the front surface of the bezel.

12. The light device according to claim 1, wherein an angle formed between the second surface of each effecting facet of the one or more effecting facets and a longitudinal axis of the bezel is 90 degrees.

13. The method of the lighting device according to claim 9, wherein the metallized surface is configured to have a pre-determined reflectivity.

14. The method of the lighting device according to claim 9, wherein an angle formed between the first surface of each effecting facet of the one or more effecting facets and the second surface of each effecting facet of the one or more effecting facets is 45 degrees.

* * * * *